United States Patent [19]

DeGuire et al.

[11] Patent Number: 5,298,654

[45] Date of Patent: Mar. 29, 1994

[54] METHOD FOR PRODUCING COPRECIPITATED MULTICOMPONENT OXIDE POWDER PRECURSORS

[75] Inventors: Mark R. DeGuire, Cleveland Heights; Warren H. Philipp, Olmsted Township, Cuyahoga County, both of Ohio

[73] Assignee: Case Western Reserve University, Cleveland, Ohio

[21] Appl. No.: 24,650

[22] Filed: Mar. 1, 1993

Related U.S. Application Data

[63] Continuation of Ser. No. 620,019, Nov. 30, 1990, Pat. No. 5,252,314.

[51] Int. Cl.[5] .............................................. C07C 55/06
[52] U.S. Cl. .................................................... 562/597
[58] Field of Search ........................................ 562/597

[56] References Cited

U.S. PATENT DOCUMENTS 3,441,373  4/1969  Bonsack ............................. 562/597
4,490,297  12/1984  Feld ................................... 562/597

FOREIGN PATENT DOCUMENTS 210660  2/1987  European Pat. Off. .
270319  11/1988  Japan .
307102  12/1988  Japan .

OTHER PUBLICATIONS

Pramanik Petal Review of Solid State Science, vol. 2 Nos. 2 & 3 (1988) 157–159.
Chen, C. et al. J. Magn. Reson. 22(1) 139–47 1973.
Ghosh, Petal, Technology 9(1), 65–7 1972.
Adams, J. M. et al J. Chem. Soc. Chem. Commun. (10), 358–9 1976.
Nikifonova, E. E. et al, Vysorcomol Soedin, Ser. B 14 (7) 533–6 1972.
James S. Reed, Introduction to the Principles of Ceramic Processing, pp. 48–51, John Wiley & Sons, 1988.
Flandermeyer, and R. B. Poeppel, Inorg. Chem. 26 [10] 1474–1476 (1987).
K. Kaneko, H. Ihara, M. Hirabayashi, N. Terada, and K. Senzaki, Jap. J. Appl. Phys. 26 [5] L734–L735 (1987).
M. H. Kayser, B. Borglum, G. Antony, S. G. Shyu, and R. C. Buchanan, Mat. Res. Soc. Symp. Proc. vol. 99, 159–164 (1988).
K. Sawano, A. Hayashi, T. Ando, T. Inuzuka, and H. Kubo, pp. 282–293 in Research Update, 1988—Ceramic Superconductors II, edited by M. F. Yan.
American Ceramic Society, Westerville, Ohio, 1988.
P. K. Gallagher and F. Schrey, J. Am. Ceram. Soc. 47[9] 434–437 (1964).
P. K. Gallagher, H. M. O'Bryan, Jr., E. Schrey, and F. R. Monforte, Bull. Am. Ceram. Soc. 48[11] 1053–1059 (1969).
Adams and Pritchard, J. Appln. Crystallogr. 8 392 (1975); Joint Committee on Powder Diffraction Standards, Swarthmore, Pa., Inorganic file No. 29-1735.
Caillaud, F., Baumard, J. F., and Smith, A.; Mat. Res. Bull., vol. 23, pp. 1273–1283 (1988), A Model for the Preparation of $YBa_2Cu_3O_{7-\delta}$ Orthorhombic Phase by Controlled Precipitation of Oxalates.
Kini, Geiser, Kao, Carlson, Wang, Monaghan and Williams; Inorganic Chemistry vol. 26, No. 12, 1987.
Japanese Journal of Applied Physics, vol. 27, No. 4, Apr. 1988, pp. L649–L651; Preparation of Superconducting Bi–Ca–Sr–Cu–O Printed Thick Films Using a Coprecipitation of Oxalates.
O'Sullivan et al., "Simple Spray Deposition Technique", Appl. Phys. Lett. 52(2), Jan. 11, 1988, pp. 163–165.
Pramanik et al., "Preparation of Superconducting Ceramic Oxides by Co-Precipitation of Metal Ion Oxalates . . . " Proceedings May 2–4, 1988.

*Primary Examiner*—Paul J. Killos
*Attorney, Agent, or Firm*—Fay, Sharpe, Beall, Fagan, Minnich & McKee

[57] ABSTRACT

Guanidine oxalate is used as a precipitating agent in the coprecipitation of multicomponent oxide powder precursors. A solution of a soluble inorganic salt is combined with a solution of guanidine oxalate. A resultant metal oxalate is precipitated from the solution and can thereafter be subjected to heat to convert the metal oxalate into a multicomponent ceramic powder.

11 Claims, No Drawings

METHOD FOR PRODUCING COPRECIPITATED MULTICOMPONENT OXIDE POWDER PRECURSORS

This is a continuation of U.S. application Ser. No. 07/620,019 filed Nov. 30, 1990 now U.S. Pat. No. 5,252,314.

BACKGROUND OF THE INVENTION

This invention pertains to the art of ceramic powder precursors, and more particularly to a method for producing coprecipitated multicomponent oxide powder precursors.

The invention is particularly applicable to a method for coprecipitating metal oxalates as precursors for multicomponent oxide powders used in producing ceramics for a variety of applications, acid will be described with particular reference thereto. It will be appreciated, however, that the invention may be advantageously employed in other environments and applications.

The coprecipitation of mixed salts from liquid solutions is a well-established method of ceramic powder precursor synthesis. Coprecipitation refers to the simultaneous precipitation of more than one metal from the same solution.

A multicomponent liquid solution of soluble inorganic salts (e.g., metal nitrates, halides, sulfates) is typically combined with a liquid solution of a precipitating agent compound. The precipitating agent is chosen such that, when dissolved and combined with the metals solution, one of its radicals combines with the metal ions to form insoluble salts which thermally decompose to form oxides. The insoluble salts will precipitate in a very finely divided and intimately mixed state. Heating the precipitate decomposes these salts, resulting in a chemically homogeneous, fine oxide powder with high surface area. This powder may then be fabricated into a number of ceramic products using various ceramic fabrication techniques. Examples of such ceramic products Include, but are not limited to, electrical or electronic ceramics (integrated circuit substrates, capacitors, piezoelectric transducers, ferroelectric devices, or optical or optoelectronic devices, solid electrolytes, electronically conductive ceramic electrodes, and ceramic superconductors); Magnetic ceramics (magnetic storage media, video or audio tape heads, transformer cores, memory devices or arrays); ceramics used primarily for their strength, hardness and/or chemical stability (refractories; heat exchangers; abrasives; fibers for reinforcement; bulk materials and coatings for protection from heat, oxidation, corrosion, wear, stress, or other physical or chemical changes; catalyst substrates); pigments; and catalysts.

The type of precipitate formed depends oil the precipitating agent used. The precipitating agent can be selected from among a variety of compounds including, as examples, hydroxides, carbonates, and oxalates. Although there are advantages and disadvantages to using each of the various types of precipitating agents, precipitated carbonates and hydroxides in many cases tend to be gelatinous thereby difficult to rinse, separate, and filter.

As a class, oxalates are generally highly insoluble, and they form particles that are readily filtered from the liquid and easy to handle. For example, oxalates of the following compounds exhibit low water solubility: Al, Ba, Bi, Cd, ca, Ce(III), Cr(II), Co, Cu, the rare earths, Ga, Fe(II), Pb, Mg, Mn, Hg, Nf, Ag, Sr, Tl(I), Th, U, Y, and Zn.

Coprecipitated oxide powder precursors offer increased homogeneity as well as increased reactivity over those precursors which are not coprecipitated. While coprecipitation is not the only way to achieve these advantages, the increase in homogeneity and reactivity is especially advantageous in multicomponent oxide systems where the attainment of solid-state equilibrium is often slow, or when reactions must be carried out below a melting temperature. These conditions prevail in the cuprate superconductors, for example, and several coprecipitation routes for their synthesis have been reported. Coprecipitation has also been used to produce magnetic oxide materials.

In current coprecipitation procedures, many of the precipitated salts exhibit slight solubilities in the supernatant liquid. This leads to incomplete precipitations.

To insure a complete precipitation and the precise cation stoichiometry desired, the pH of the mixture is controlled. In light of this, there are several disadvantages associated with the prior art methods of coprecipitation.

First, if alkali metal hydroxides (e.g., NaOH, KOH etc.) are used to adjust the pH of the precipitating solution, extensive washings of the precipitates are necessary to remove alkali metal residues which remain as contaminants in the final mixed oxide product. Similar contamination of the powder by alkali metals can result from using alkali metal oxalates or carbonates (e. g. , $Na_2C_2O_4$ or $Na_2CO_3$) as precipitating agents.

Second, if aqueous ammonium hydroxide is used to neutralize the pH, or if ammonium oxalate is used as a precipitating agent, water-soluble ammonia complexes of certain ions (e.g., copper, nickel or silver) can form.

Third, if weak organic bases are used, it is difficult to achieve a high enough pH required to quantitatively precipitate many oxalates unless large quantities of the weak base are used in some cases, because of their relatively high molecular weights, the large amount of weak base needed becomes impractical. As is the case with ammonia, many weak organic bases form soluble amine complexes with some cations such as $Cu^{++}$ and $Ni^{++}$. This tends to prevent quantitative precipitation of these cations.

Fourth, of the moderately strong organic bases, the tertiary amines, only trimethylamine, the first in the series, is practical in terms of a convenient equivalent weight. The equivalent weights of the tertiary amines increase rapidly upon going up in the series to triethylamine and tripropylamine. Trimethylamine, however, offers a few disadvantages in that it is expensive to obtain and, in addition, has three carbon atoms per molecule which may leave a carbon residue, especially on firing in a nonoxidizing atmosphere.

Of the very strong bases, the quaternary ammonium hydroxides, about equal in strength to sodium hydroxide, only the first in the series, tetramethylammonium hydroxide, is practical. Tetramethylammonium hydroxide, nonetheless, the drawbacks similar to those found in using trimethylamine.

Fifth, a pH adjustment, subsequent to the Initial precipitation, leads to a second precipitation. The second precipitate would probably have a different composition than the first. This could lead to some degree of segregation of the metals within the precipitate, as well as a loss of compositional homogeneity. For homogeneity of a coprecipitate, a single one-time precipitation is advised.

Sixth, the solutions can be chilled or mixed with alcohol to decrease the solubility of the precipitates. The alcohol can also act as an antifreeze enabling precipitations below 0° C. However, several precipitating agents have lower solubility in cold water or are insoluble in alcohol. Examples of these precipitating agents include the oxalates of sodium, potassium, and ammonium.

It would be desirable to develop a method for quantitatively coprecipitating multicomponent, chemically homogeneous oxide powder precursors.

It would be further desirable to develop a method for coprecipitating multicomponent oxide powder precursors such that upon decomposition, intimately mixed, finely divided oxides with high surface area and chemical homogeneity would be produced.

The present invention demonstrates a new and improved method which addresses the above-referenced problems and others, and provides a method for coprecipitating multicomponent ceramic powder precursors that is simple, quantitative, and economical.

BRIEF DESCRIPTION OF THE INVENTION

In accordance with the present invention, there is provided a method for the quantitative production of coprecipitated precursors for multicomponent oxide powders.

In accordance with a more limited aspect of the invention, a method for quantitatively coprecipitating metal oxalate precursors of multicomponent oxide powders is provided. That is, a solution of soluble inorganic salts is combined with a solution of guanidine oxalate. Metal oxalates forms and quantitatively precipitates from the resultant solution. The precipitated metal oxalates are suited for subsequent conversion to a chemically homogeneous multicomponent metal oxide.

A principle advantage of the invention is that it provides an inexpensive, relatively simple method for quantitatively precipitating chemically homogeneous metal oxalate precursors of multicomponent oxide powders for ceramics.

Another advantage of the present invention is that the metal oxalates which are produced in accordance with the disclosed method are substantially free of contaminants which can leave residues in the final mixed oxide product.

Still other advantages and benefits of the invention will become apparent to those skilled in the art upon a reading and understanding of the following detailed description.

DETAILED DESCRIPTION OF THE PREFERRED EMBODIMENT

The present invention is directed to the use of guanidine oxalate, also known as guanidinium oxalate, $[HN=C(NH_2)_2]_2H_2C_2O_4$, as a precipitating agent for the preparation of oxalates which are precursors to mixed oxide powders.

Guanidine oxalate is the oxalate of the strong base guanidine, $NH=C(NH_2)_2$. It can be synthesized inexpensively as it is easily made by adding a concentrated oxalic acid solution to a concentrated solution of guanidine carbonate.

Advantages of using guanidine oxalate as a reagent for coprecipitating mixed oxalates, precursors to metal oxides, over state of the art techniques may be better understood by comparing its properties to those of commercially available water soluble oxalates. These commercially available oxalates include sodium oxalate, $Na_2C_2O_4$; potassium oxalate, $K_2C_2O_4$; ammonium oxalate, $(NH_4)_2C_2O_4$; and oxalic acid, $H_2C_2O_4$.

Among the major disadvantages of using $Na_2C_2O_4$ and $K_2C_2O_4$ as precipitating agents is that these oxalates contain a non-volatile cation that is not readily removed by firing. Finely divided, freshly precipitated metal oxalates adsorb and occlude $Na^+$ and $K^+$ which can remain in significant amounts even after washing the precipitate. $Na^+$ and $K^+$ will not be removed completely by firing; therefore, Na and K compounds remain as impurities in the final product. Such impurities are detrimental to desirable high temperature and electronic properties of mixed oxides.

While $(NH_4)_2C_2O_4$ contains the $NH_4^+$ cation which is readily removed by firing to provide a pure fired product free from contamination, $(NH_4)_2C_2O_4$ has a number of disadvantages. First, $(NH_4)_2C_2O_4$ forms soluble ammonia complexes with certain metal cations such as Ni, Co, and Cu. Thus, quantitative precipitation of oxalates involving these metals does not take place. Second, $(NH_4)_2C_2O_4$ has low solubility in both cold water and cold water-alcohol systems. As a result, $(NH_4)_2C_2O_4$ cannot be effectively used in cold aqueous systems. Some oxalates, such as $SrC_2O_4$, have decreased solubility in cold aqueous systems and are, therefore, more quantitatively precipitated at lower temperatures.

As with $(NH_4)_2C_2O_4$, oxalic acid fires to volatile products and leaves no residue contaminant in the fired material. Oxalic acid, however, has a number of disadvantages. First, aqueous $H_2C_2O_4$ solutions are acidic. Generally, metal oxalates are significantly more soluble in acid solutions than they are in slightly alkaline solutions. With $H_2C_2O_4$, quantitative oxalate precipitation cannot be accomplished in many cases.

Secondly, to reduce the solubility of metal oxalates, $H_2C_2O_4$ solutions in ethanol have been used as precipitating reagents. However, because of the acidic nature of $H_2C_2O_4$, it is still necessary to raise the pH via a subsequent addition of a basic solution. This second addition results in a second precipitation. The two-step process does not facilitate an ideal coprecipitation. An effective coprecipitation should be accomplished by a single operation where all of the metal salts and solutions are quantitatively and simultaneously precipitated as oxalates.

Finally, oxalates of the strongly basic quaternary ammonium hydroxides such as tetramethylammonium oxalate, $[(CH_3)_4N]_2C_2O_4$ (TMAOx) have been considered. TMAOx is the simplest of the quaternary oxalates in terms of number of carbon atoms. The next in t)-ie series of quaternary ammonium oxalates, tetraethylammoniumoxalate, has too high a molecular weight to be practical as a reagent for oxalate precipitation.

TMAOx has most of the desirable properties of a good oxalate precipitating reagent including high pH, non-complexing chemistry, good solubility in cold water, and it contains a volatile cation. TMAOX, however, has two major disadvantages when compared to guanidine oxalate.

First, the tetramethyl ammonium cation contains four carbon atoms instead of one as in the guanidinium cation. This greater number of carbon atoms could lead to Incomplete pyrolysis with a greater tendency to produce free carbon, especially if the pyrolysis is carried out at a reduced temperature. Second, based on the cost of commercially available tetramethylammonium salts required to synthesize TMAOX, this oxalate would be considerably more expensive on a weight basis than guanidine oxalate. Guanidine oxalate is conveniently prepared from inexpensive commercially available guanidine carbonate.

The use of guanidine oxalate as a precipitating agent offers several advantages. For instance, guanidine oxalate permits highly quantitative, one-step precipitations. That Is, since guanidine oxalate Is the salt of a very strong base (equivalent in basicity to sodium hydroxide) and a weak acid (oxalic acid, $HO_2CCO_2H$), a solution of guanidine oxalate has a high pH. When such a solution is added to acidic metal salt solutions (such as halide, perchlorate, or nitrate solutions), the resulting supernatant is neutral or only slightly acidic. As a result, the need to neutralize the pH in a separate subsequent step is reduced or eliminated, while a quantitative oxalate precipitation is achieved.

Next, guanidine oxalate does not promote inorganic contamination. Because guanidine is organic, any guanidine salts (e.g., nitrates, perchlorates, chlorates) that may be carried down with the insoluble oxalates are completely pyrolyzed during the conversion by heat of the oxalates to oxides. (Guanidine chlorate, $GHClO_3$, is especially thermally unstable).

It must be noted that salts of organic bases with oxidizing anions, nitrates, perchlorates and chlorates can undergo explosive thermal decomposition; the nitrates are the least hazardous of the three in this regard. Adequate precaution should be taken against violent decomposition of absorbed perchlorates and chlorates during firing of such oxalate precipitates. For a particular system involving perchlorates or chlorates, it is advisable to test pyrolize small samples to determine the extent, if any, of an exothermic perchlorate or chlorate decomposition. Supernatent solutions containing perchlorates or chlorates should not be heated to dryness.

Guanidine oxalate Is a preferred precipitating agent because it is a relatively simple organic molecule that completely pyrolyzes in air at 700° C. Thus, uncontaminated oxides are obtained, without washing or rinsing the precipitate.

Additionally, guanidine has a lower molecular weight (59.07 g/mol), and fewer carbon atoms (it has only one) than other strong organic bases. Therefore, guanidine oxalate yields a higher concentration of oxalate ion per gram, and there is less organic material to be eliminated. This reduces the likelihood of carbon contamination in the oxide powder.

Also, use of guanidine oxalate as a precipitating agent promotes high yields. It permits one-step precipitation so that pH adjustment is unnecessary. Guanidine oxalate is very soluble both in cold water and in ethanol-water solutions. Therefore, the volume of the supernatant can be reduced, and guanidine oxalate can be used advantageously for those oxalates which precipitate more completely in alcohol-water systems than in purely aqueous systems.

Further, guanidine oxalate does not form soluble complexes with nickel or copper.

Aside from using guanidine oxalate as a precipitating agent, guanidine hydroxide itself may also be used as a strong base to replace NaOH, KOH, $NH_4OH$, or basic organic amines. Guanidine carbonate may also be used instead of $Na_2CO_3$ or $K_2CO_3$ for the precipitation of insoluble metal carbonates. Other guanidine salts may replace the corresponding sodium or potassium salts where a volatile or combustible cation (e.g., the guanidine ion) is needed.

Hydrated guanidine oxalate has been synthesized and characterized using differential thermal analysis (DTA), thermogravimetry (TGA), and x-ray diffraction (XRD). TI)e use of guanidine oxalate in the coprecipitation of several mixed oxide systems has been demonstrated. These systems include manganese-zinc ferrites, yttrium-cerium oxides, and cuprate superconducting compounds in the La-Sr-Cu-O, Y-Ba-Cu-O and Bi-Sr-Ca-Cu-O systems. The compositions of the supernatants and the precipitates were determined using proton-induced x-ray emission (PIXE), atomic absorption (AA), and inductively coupled plasma spectrophotometry (ICP). In some cases the precipitates were calcined and sintered, and characterized to confirm their homogeneity, high reactivity, and composition.

Guanidine oxalate was synthesized by adding a stoichiometric amount of concentrated oxalic acid solution to a concentrated solution of commercially available guanidine carbonate (96%, Alfa Products):

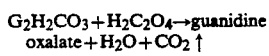
$$G_2H_2CO_3 + H_2C_2O_4 \rightarrow \text{guanidine oxalate} + H_2O + CO_2 \uparrow$$

The oxalic acid was added slowly to the carbonate so that the $CO_2$ effervescence did not cause extensive foaming and loss of liquid. Afterward, the solution was evaporated to dryness below 1000° C. A white residue was dissolved in a minimal amount of hot water, and stirred with activated charcoal to remove any insoluble colloidal impurities from the guanidine carbonate. The clear solution was filtered, then evaporated to dryness below 100° C., and stored.

Next, the guanidine oxalate was purified by recrystallizing it from an ethanol/water solution. This was accomplished by first suspending the crude guanidine oxalate in hot absolute ethanol, then adding water just until the guanidine oxalate dissolved. The hot, nearly saturated solution was cooled overnight to −100° C. to crystallize the oxalate. The crystals were filtered, washed with a small quantity of absolute ethanol, and dried at room temperature.

The powder x-ray diffraction (XRD) pattern of the crude guanidine oxalate did not match the published pattern for guanidine oxalate monohydrate. After recrystallization, XRD showed that the material was predominantly, but not entirely, the monohydrate. Weight measurements indicated that there was more than one mole of water (either hydrated or occluded) per mole of oxalate. Therefore, to avoid underestimating the amount of oxalate ion available during precipitations, the synthesized material was assumed to be a dehydrate.

Thermogravimetric analysis (TGA) of guanidine oxalate in air at a heating rate of 5° C./min showed that it was completely pyrolyzed (100% weight loss) at 700° C. TGA in helium at 5° C./min gave 99% weight loss at 800° C. The remainder was probably unreacted carbon, which would be burned off in air.

To demonstrate that guanidine oxalate does not form soluble complexes with copper ions, the following test was performed. When the required amount of ammonium oxalate was added to a copper (II) nitrate solution, the supernatant above the precipitated copper oxalate was blue, Indicating the presence of dissolved copper-ammonia complex. The use of guanidine oxalate instead of the ammonium salt yielded a clear supernatant with a cu content of 6.6 ppm by weight.

Once the guanidine oxalate is synthesized, it is mixed with a solution of cold water or cold water and alcohol. The temperature of the cold water can range from about its freezing point to about room temperature (roughly 25° C.) or higher. Preferably, the temperature range of the water is low, between about 0° C. and about 5° C. Similarly, the temperature of the alcohol/water solution can range from about or slightly above its freezing point (below 0° C.) and room temperature (roughly 25° C.) or higher. The preferred temperature of use for the alcohol/water solution is about 50° C. and lower. These low temperatures are preferred because the metal oxalates are less soluble at lower temperatures.

The alcohol used in the water alcohol solution can be selected from those soluble in water and having a low molecular weight. Particularly, the alcohol can be selected from among methanol, ethanol, 1-propanol and 2-propanol.

A solution of water and at least two types of soluble Inorganic salts is prepared and mixed with the above guanidine oxalate solution. The soluble inorganic salts can be selected from among sulfates, acetates, halides, nitrates, chlorates or perchlorates of Metals including Al, Ba, Bi, Cd, Ca, Ce(III), Cr(II), CO, Cu, the rare earths, Ga, Fe(II), Pb, Mg, Mn, Hg, Ni, Ag, Sr, Tl(I), Th, U, Y, and Zn.

Once the two solutions are prepared, they are combined and stirred. The temperature of tile combined solution is within the ranges discussed above with respect to the guanidine oxalate and water or alcohol/water solutions. The guanidine oxalate and metal salts react to quantitatively coprecipitate an intimate mixture of metal oxalates. A precipitate forms and falls to the bottom of the beaker which Is then centrifuged to more quickly separate the precipitate. The precipitate is removed, subjected to filtration and dried in an oven to remove any excess water. Thereafter, the mixture of coprecipitated metal oxalates is fired in a furnace to remove any impurities, organic or otherwise, and to convert the metal oxalates to an intimate mixture of metal oxides.

The invention will now be more particularly described by the following Examples:

EXAMPLE 1

A first application of guanidine oxalate was in the precipitation of precursors to superconducting Bi-Sr-Ca-Cu oxides. The use of guanidine oxalate as a precipitating agent was compared to two other precipitating agents: (1) tetrapropyl ammonium oxalate (TPAO), and (2) a nonaqueous ethanol/oxalic acid solution ($EtOH/H_2C_2O_4$), with subsequent pH adjustment using ammonia dissolved in ethanol.

In the TPAO precipitation, $Bi_2O_3$, $SrCO_3$, $CaCO_3$, and CuO were weighed out in amounts that would yield 20 g of $Bi_2Sr_2CaCu_2O_8$. These were dissolved in 38 g of $HNO_3$ and 45 g $H_2O$, and stirred until the solution was clear. Oxalic acid was added to a 10% aqueous solution of tetrapropyl ammonium hydroxide until the pH reached 8.8. Approximately 30 ml of the metals solution was then added to roughly 300 ml of the oxalate solution while stirring. The mixture, which was at a temperature of 23° C., was then centrifuged. The liquid was decanted and analyzed (see Table I) and its pH was 1.7. The solid was dried at 90° C. overnight and analyzed (see Table I).

For the guanidine oxalate and $EtOH/H_2C_2O_4$ precipitations, a Bi:Sr:Ca:Cu solution with stoichiometry 2:2:2:3 was prepared by mixing $Bi(NO_3)_3 \cdot 5H_2O$, $Sr(NO_3)_2$, $Ca(NO_3)_2 \cdot 4H_2O$, and $Cu(NO_3)_2 \cdot 3H_2O$, in amounts to yield 100 g of oxide, in 300 ml of deionized water. An aqueous solution of 60 wt % $HNO_3$ was added gradually while stirring until the solution was clear, yielding approximately 435 ml of solution.

For the guanidine oxalate precipitation, 40 ml of the metals solution was added to a stirred solution of 40 g of guanidine oxalate in 1 liter of water. The large excess (65%) of oxalate and large solution volume was chosen to achieve a high pH (6.0 before the metals addition, 3.9 after precipitation), and a fine particle size. The mixture was centrifuged and the supernatant was analyzed.

For the $EtOH/H_2C_2O_4$ precipitation, the method followed was analogous to that reported in Sawano et. al., "Processing of Superconducting Ceramics for Flight Critical Current Density," *Research Update 1988—Ceramic Superconductors II*, ed. M. F. Yan (1988), pg. 282–293. That is, 20 ml of the above solution was added to 500 ml of a solution of 10% excess oxalic acid in ethanol at 5° C. The pH was 0.9 after the precipitation began. A solution of ammonia in chilled ethanol was then added to raise the pH to 8.5; small additions of oxalic acid in ethanol were then added to achieve a pH of 7.0. This precipitate settled extremely slowly. The mixture was centrifuged, and both the supernatant and the solid were analyzed. Results are set forth in Table I. The subscripts which appear under the Chemical Analysis sections of the tables below denote the uncertainty in the most significant digit.

TABLE I

| System $Bi_2Sr_2Ca_{n-1}Cu_nO_x$ | Method | Chemical Analysis | | | |
|---|---|---|---|---|---|
| | | Ca | Cu | Sr | Bi |
| supernatant - guan. oxal. (ppm) | ICP | 1 | $6.6_2$ | $7.8_1$ | $31.6_1$ |
| supernatant - TPAO (ppm) | AA | $640_{50}$ | $30.8_3$ | $390_{10}$ | $9.9_1$ |
| solid, cation % | (target) | 14.3 | 28.6 | 28.6 | 28.6 |
| TPAO | AA | 18.2 | 29.1 | 23.4 | 29.3 |
| supernatant - $H_2C_2O_4$/EtOH (ppm) | AA | 0.2 | <1 | <0.1 | <1 |
| solid, cation % | (target) | 22.2 | 33.3 | 22.2 | 22.2 |
| $H_2C_2O_4$/EtOH | AA | 20.9 | 35.6 | 20.9 | 22.7 |

Favorable results in the Bi-Sr-Ca-Cu-O system led to the exploration of the use of guanidine oxalate to coprecipitate several other mixed oxide precursors of current scientific or technological interest. The following procedures were followed in all cases, unless otherwise noted, and all chemicals used were of reagent grade. One liter of metals solution was added to 1.5 liters of cold guanidine oxalate solution, while stirring. The latter solution contained 10% excess oxalate ion. Stirring was continued for at least one hour. The insoluble oxalates were recovered by centrifuging, then decanting the supernatant. Next, the supernatant was chemically analyzed for residual metal cations. The settled oxalate slurry was filtered by suction to remove excess liquid.

EXAMPLE 2

The recently discovered cuprate-based oxide superconductors particularly benefit from two of the advantages of using guanidine oxalate: (1) the absence of alkali contamination, which would be deleterious to electrical properties; and (2) the avoidance of the formation of soluble Cu complexes.

A liter of solution containing 0.15 mole $Cu(NO_3)_2$, 0.10 mole Ba $(NO_3)_2$, and 0.05 mole Y $(NO_3)_2$ (corresponding to the stoichiometry of $YBa_2Cu_3O_{7-x}$) was prepared. This was added to the guanidine oxalate solution at room temperature while stirring. The mixture was centrifuged, and the supernatant was analyzed to determine the remainder of Cu, Y and Ba remaining in the solution. The results are shown in Table II.

The experiment was repeated using similar cation ratios prepared from acetate salts. Table II sets forth the results of this experiment.

TABLE II

| System | | Chemical Analysis | | |
|---|---|---|---|---|
| $YBa_2Cu_3O_{7-x}$ | Method | Cu | Y | Ba |
| supernatant - | ICP | $1.8_1$ | $0.4_1$ | $5.4_1$ |
| nitrates (ppm) | PIXE | $1.5_1$ | <0.8 | $8_2$ |
| supernatant - | ICP | $3.4_1$ | $0.4_1$ | 30.06 |
| acetates (ppm) | PIXE | $3.2_2$ | <0.8 | $14_2$ |

As can be seen, only a trace amount of Cu, Y, and Ba remained in solution. The precipitation of the metal oxalates was fairly complete.

EXAMPLE 3

Because the solubility of strontium oxalate increases significantly with increasing temperature, the coprecipitation of the La-Sr-Cu system was performed in a cold water-alcohol solution. A cold, 1-liter solution containing 0.05 mole each of $LA(NO_3)$, $La(NO_3)_3$, and $Cu(NO_3)_2$ was added to a guanidine oxalate solution containing 30% ethanol at below 0° C. Table III shows the results of the supernatant analysis.

TABLE III

| System | | Chemical Analysis | | |
|---|---|---|---|---|
| $(La,Sr)_2CuO_4$ | Method | Cu | Sr | La |
| supernatant (ppm) | ICP | $1.0_1$ | $0.8_1$ | $0.2_1$ |

As in the case of the $YB_aCu_3O_{7x}$ system of Example 2, only trace amounts of Cu, Sr and La remained in the supernatant. Metal oxalate precipitation was substantially complete.

EXAMPLE 4

Because of the increasing solubility of cerium(III) oxalate with increasing temperature, the precipitation of $Y_2Ce_8O_{19}$ was performed in a 30% ethanol-water solution of guanidine oxalate at 0° C. The starting 1-liter solution contained 0.1 mole $Ce(NO_3)_3$ and 0.025 mole $Y(NO_3)_3$. Results of the supernatant analysis are shown in Table IV.

TABLE IV

| System | | Chemical Analysis | |
|---|---|---|---|
| $Y_2Ce_8O_{19}$ | Method | Y | Ce |
| supernatant | ICP | 0.2 | 1.0 |
| | PIXE | <1.2 | <4.4 |

EXAMPLE 5

$Mn_{0.5}Zn_{0.5}Fe_2O_4$ is typical composition of a commercially important magnetic oxide. It Is of the type used in magnetic recording heads, inductors, transformers, and video display tubes. The high solubility of iron (III) oxalate in water makes it important to avoid forming the FE(III) ion.

Solutions containing 0.1 mole $FeSO_4$, 0.025 mole $MnSO_4$ and 0.025 mole $ZnCl_2$ were prepared. In a first precipitation, the solutions were kept cold, and a small amount of zinc dust was added to the solution to reduce any FE(III) to Fe(II). The added zinc apparently succeeded at eliminating Fe(III), as evidenced by the low Fe content In the supernatant. The comparatively high Zn content may Indicate that some of the added Zn metal remained in the supernatant (see Table V).

TABLE V

| System | | Chemical Analysis | | |
|---|---|---|---|---|
| $Mn_{0.5}Zn_{0.5}Fe_2O_4$ | Method | Mn | Fe | Zn |
| supernatant - cold water/Zn | ICP | 3.7 | 2.2 | 71 |
| supernatant - using cold EtOH | ICP | 188 | 263 | 8 |
| | PIXE | $5.1_4$ | $126_8$ | $4.5_3$ |
| powder, cation % | (target) | 16.67 | 66.67 | 16.67 |
| | PIXE | $16_1$ | $65_4$ | $18_1$ |

In a second precipitation, a cold ethanol/water solution of guanidine oxalate was used, without Zn dust. Results shown in Table V indicate that this was less effective at aiding the precipitation of the Fe, as comparatively large amounts of Fe remained in solution.

Discussion

Tables I–V show the results of chemical analyses of the supernatants and precipitates. As the results indicate, guanidine oxalate generally achieved very complete precipitations, particularly of Y and the rare earths (La, Ce). The La-Sr-Cu precipitation, for example, achieved greater than 99.9% precipitation of the metals (from an initial metals concentration of 0.6% in the total system, to 2 ppm total metals in the supernatant), as did the Y-Ce precipitation. Where two analyses of the same liquid were performed, there was substantial agreement between analytical techniques.

In the comparison to other oxalate coprecipitations of BI-Sr-Ca-Cu-O precursors, Table I shows that the TPAO precipitation left several hundred ppm of Ca and Sr in solution. The solid (unexpectedly) showed a large excess of Ca, suggesting that it was not compositionally homogeneous. The $EtOH/H_2C_2O_4$ precipitation was highly quantitative (less than or equal to 1 ppm total metals), as would be expected from the extraordinary precautions involved: a nearly non-aqueous system, chilled, with ammonia pH adjustment. However, the precipitation occurred in multiple stages, with additional precipitate forming after each pH correction.

In comparison, the single-step aqueous guanidine oxalate coprecipitation, at room temperature and without pH adjustment, gave metals concentrations in the supernatant less than 10 ppm for all components except Bi, which was at nearly 32 ppm (Table 1).

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

We claim:

1. A method for coprecipitating metal oxalate precursors for multicomponent metal oxide powders, comprising the steps of:

synthesizing and isolating guanidine oxalate;

purifying the isolated guanidine oxalate by recrystallization;

dissolving purified guanidine oxalate in water at a temperature below about 25° C. to provide a guanidine oxalate solution;

mixing the guanidine oxalate solution with a solution comprising a soluble metal salt and water to form a resulting solution; and precipitating a metal oxalate from the resulting solution.

2. A method for coprecipitating metal oxalate precursors for multicomponent metal oxide powders, according to claim 1, wherein the soluble metal salt includes an oxidizing anion.

3. A method for coprecipitating metal oxalate precursors for multicomponent metal oxide powders, according to claim 1, wherein the guanidine oxalate solution is comprised of guanidine oxalate, water and a water soluble alcohol having 1–3 carbon atoms per molecule.

4. A method for coprecipitating metal oxalate precursors for multicomponent metal oxide powders, according to claim 3, wherein the alcohol is ethanol.

5. A method for coprecipitating metal oxalate precursors for multicomponent metal oxide powders, according to claim 3, wherein the alcohol is methanol.

6. A method for coprecipitating metal oxalate precursors for multicomponent metal oxide powders, according to claim 1, wherein the step of purifying includes the steps of:

suspending guanidine oxalate in hot alcohol;

adding water to dissolve the guanidine oxalate to form a nearly saturated solution; and cooling the nearly saturated solution to drystallize the guanidine oxalate.

7. A method for precipitating multicomponent oxide precursors, comprising the steps of:

synthesizing stoichiometric guanidine oxalate according to a process including a step of adding oxalic acid to a solution of guanidine carbonate;

purifying the stoichiometric guanidine oxalate;

adding the purified guanidine oxalate to a solution comprising water or water and alcohol to provide a guanidine oxalate solution;

mixing the guanidine oxalate solution with an aqueous soluble metal salt solution to form a resultant solution having a temperature of less than about 25° C.;

precipitating a substantially homogeneous metal oxalate product from said resulting solution.

8. A method for coprecipitating multicomponent oxide precursors, according to claim 7, wherein the soluble inorganic salt solution includes more than one type of metal ion.

9. A method for coprecipitating multicomponent oxide precursors, according to claim 8, wherein more than one type of metal oxalate precipitates from the resultant solution.

10. A method for coprecipitating multicomponent oxide precursors, according to claim 7, wherein the guanidine oxalate is synthesized according to the steps of:

adding a stoichiometric amount of concentrated oxalic acid solution to a concentrated solution of guanidine carbonate to provide a resultant solution;

evaporating the resultant solution to leave a residue;

dissolving the residue in water;

removing insoluble colloidal impurities; and filtering the guanidine oxalate from the solution.

11. A method for precipitating multicomponent oxide precursors, according to claim 7, wherein the step of purifying includes the step of:

recrystallizing the guanidine oxalate from an alcohol/water solution.

* * * * *